United States Patent
Zheng et al.

(10) Patent No.: US 10,317,727 B2
(45) Date of Patent: Jun. 11, 2019

(54) BLACKLIGHT MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Hui Zheng, Beijing (CN); Minghui Zhang, Beijing (CN); Hanyan Sun, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 7 days.

(21) Appl. No.: 15/541,969

(22) PCT Filed: Jan. 13, 2017

(86) PCT No.: PCT/CN2017/071141
§ 371 (c)(1),
(2) Date: Jul. 6, 2017

(87) PCT Pub. No.: WO2017/193625
PCT Pub. Date: Nov. 16, 2017

(65) Prior Publication Data
US 2018/0217445 A1 Aug. 2, 2018

(30) Foreign Application Priority Data
May 10, 2016 (CN) .......................... 2016 2 0415683

(51) Int. Cl.
G02F 1/1335 (2006.01)
F21V 8/00 (2006.01)
(Continued)

(52) U.S. Cl.
CPC .......... *G02F 1/133602* (2013.01); *G02B 6/00* (2013.01); *G02B 6/0011* (2013.01); *G02F 2001/3505* (2013.01)

(58) Field of Classification Search
CPC ......... G02F 1/133602; G02F 1/133603; G02F 1/133605; G02B 6/0011; G02B 6/00
See application file for complete search history.

(56) References Cited

U.S. PATENT DOCUMENTS

2010/0226146 A1\* 9/2010 Cho ..................... G02B 6/0016
362/612
2012/0261682 A1\* 10/2012 Zhang .................. G02B 6/0018
257/89

FOREIGN PATENT DOCUMENTS

CN 101592298 A 12/2009
CN 103244869 A 8/2013
(Continued)

OTHER PUBLICATIONS

English translation of PCT International Search Report, Application No. PCT/CN2017/071141, dated Mar. 14, 2017, 2 pages.
(Continued)

*Primary Examiner* — Anh T Mai
*Assistant Examiner* — Nathaniel J Lee
(74) *Attorney, Agent, or Firm* — Armstrong Teasdale LLP

(57) ABSTRACT

Embodiments of the present disclosure relate to a backlight module and a display device. The backlight module includes a light source and a light guide plate, the light source provided on at least one side of the light guide plate, wherein a side of the light guide plate facing the light source includes a light receiving surface facing the light source and a light reflecting surface above the light receiving surface, wherein an angle formed by the light receiving surface and the light reflecting surface in a direction toward inside of the light guide plate is an obtuse angle. According to the backlight
(Continued)

module and the display device provided by the present disclosure, light waste may be reduced and the utilization ratio of light energy may be improved.

17 Claims, 2 Drawing Sheets

(51) Int. Cl.
    *G02B 6/00*        (2006.01)
    *G02F 1/35*        (2006.01)

(56) References Cited

FOREIGN PATENT DOCUMENTS

| | | |
|---|---|---|
| CN | 103925515 A | 7/2014 |
| CN | 104678479 A | 6/2015 |
| CN | 204986686 U | 1/2016 |
| CN | 205581476 U | 9/2016 |
| JP | 2007335312 A | 12/2007 |

OTHER PUBLICATIONS

PCT Written Opinion, Application No. PCT/CN2017/071141, dated Mar. 14, 2017, 6 pages.: with English translation of relevant part.

\* cited by examiner

BLACKLIGHT MODULE AND DISPLAY DEVICE

CROSS REFERENCE TO RELATED APPLICATIONS

This patent application is a National Stage Entry of PCT/CN2017/071141 filed on Jan. 13, 2017, which claims the benefit and priority of Chinese Patent Application No. 201620415683.1 filed on May 10, 2016, the disclosures of which are incorporated herein in their entirety as a part of the present application.

BACKGROUND

Embodiments of the present disclosure relate to the technical field of display, and specifically, to a backlight module and a display device.

In a liquid crystal display device, since liquid crystals themselves do not emit light, it is necessary to provide a light emitting source, such as a backlight module, on the light incident side of a liquid crystal display panel to realize the display function of the liquid crystal display device. The function of the backlight module is to provide the display panel with an area source which has high illuminance and uniform, so that the display panel may display images properly. FIG. 1 schematically shows a schematic structural diagram of a conventional backlight module. As shown in FIG. 1, a light source 101 is provided on a side 103 of a light guide plate 102. Light emitted from the light source 101 is incident into the light guide plate 102 from the side 103 of the light guide plate 102 and exits from a light exiting surface of the light guide plate 102. Since the light source 101 generally has a certain light emitting angle, for example, some light emitting electrode (LED) light sources have a light emitting angle of up to 120° or more, only the light in the middle region may be incident into the light guide plate 102, while the light in the edge regions cannot be incident into the light guide plate 102, thereby resulting in a waste of light energy.

BRIEF DESCRIPTION

Embodiments described herein provide a backlight module and a display device that may effectively utilize light energy and thus reduce light waste.

In one embodiment, there is provided a backlight module which includes a light source and a light guide plate, the light source being provided on at least one side of the light guide plate, a side of the light guide plate facing the light source including a light receiving surface facing the light source and a light reflecting surface above the light receiving surface, wherein an angle formed by the light receiving surface and the light reflecting surface in a direction toward the inside of the light guide plate is an obtuse angle.

In one example, the angle formed by the light receiving surface and the light reflecting surface is greater than 150° and less than 180°.

In one example, the thickness of the light guide plate is greater than the thickness of the light source in a direction perpendicular to a surface of the light guide plate, and the light source is located on the same plane as the lower surface of the light guide plate.

In one example, a portion of the side of the light guide plate facing the light source acts as the light receiving surface and a portion of the side of the light guide plate higher than the light source acts as the light reflecting surface.

In one example, the light reflecting surface includes a reflecting coating.

In one example, the backlight module further includes a reflecting element provided below the light guide plate, the reflecting element extending to a region below the light source.

In one example, the backlight module further includes one or more optical films provided above the light guide plate, the optical films extending to the region above the light source.

In one example, the backlight module further includes a backplate provided below the light guide plate and the light source.

In one example, the light reflecting surface may be a planar surface, a concave surface, or a convex surface, and/or the light receiving surface may be a planar surface, a concave surface, or a convex surface.

In another embodiment, there is provided a display device which includes a backlight module provided in any of the embodiments herein and a display panel located above the backlight module.

In the backlight module with the above setup and the display device using the backlight module, the light reflecting surface is provided above the light receiving surface of the light guide plate, and it may reflect at least a part of light that cannot be incident into the light guide plate toward a region above the light source, so as to be utilized by the display panel located above the region where the light source is located. In this way, on the one hand, it is possible to effectively use light that cannot be incident into the light guide plate, thereby improving the utilization ratio of light energy, on the other hand, it is possible to reduce a display dark region above the light source, thus achieving a narrow bezel or even bezelless display.

Further aspects and areas of applicability will become apparent from the description provided herein. It should be understood that various aspects of this application may be implemented individually or in combination with one or more other aspects. It should also be understood that the description and specific examples herein are intended for purposes of illustration only and are not intended to limit the scope of the present application.

BRIEF DESCRIPTION OF THE DRAWINGS

The drawings described herein are for illustrative purposes only of the selected embodiments, not all possible embodiments, and are not intended to limit the scope of the present application, wherein.

Throughout the various diagrams of these drawings, corresponding reference numerals indicate corresponding parts or features.

DETAILED DESCRIPTION

Exemplary embodiments will now be described more fully with reference to the accompanying drawings.

An embodiment of the present disclosure provides a backlight module. The backlight module includes a light source and a light guide plate, the light source being provided on at least one side of the light guide plate, aside of the light guide plate facing the light source including a light receiving surface facing the light source and a light reflecting surface above the light receiving surface, wherein an angle formed by the light receiving surface and the light reflecting surface in a direction toward inside of the light guide plate is an obtuse angle.

In this embodiment, when the backlight module provided by this embodiment is applied to the display device, at least a part of light that is not incident into the light guide plate may be reflected to a region of the display panel located above the light source, so as to be utilized by the display panel, thereby reducing the loss of light energy and improving the utilization ratio of light energy.

Figure 2:
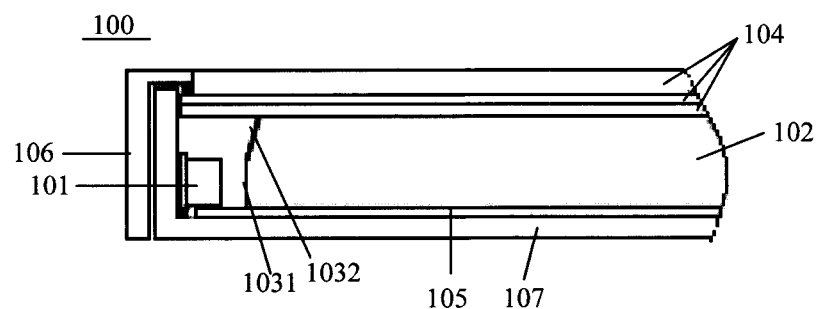
FIG. 2 shows a schematic structural diagram of an exemplary backlight module provided in an embodiment of the present disclosure.

FIG. 2 shows a schematic structural diagram of an exemplary backlight module provided in an embodiment of the present disclosure.

As shown in FIG. 2, the backlight module 100 includes a light source 101 and a light guide plate 102. The light source 101 may be provided on a side of the light guide plate 102, and the side of the light guide plate 102 facing the light source 101 may include a light receiving surface 1031 and a light reflecting surface 1032, wherein the light receiving surface 1031 may be arranged to face the light source 101, and the light reflecting surface 1032 may be located above the light receiving surface 1031. In this embodiment, the light receiving surface 1031 may couple light incident thereon into the light guide plate 102 and the light reflecting surface 1032 may at least partially reflect light incident thereon toward a region above the light source, such that use light that cannot be incident into the light guide plate may be effectively utilized by the portion of the display panel located above the light source.

The light reflecting surface and the light receiving surface may be configured to form an angle which may be greater than 90° but less than 180°, i.e., an obtuse angle, in order to enable the light reflecting surface to at least partially reflect light incident thereon toward the region above the light source. Alternatively, the angle formed by the light receiving surface 1031 and the light reflecting surface 1032 may be greater than 150° and less than 180°.

In operation, the thickness of the light guide plate may be set to be greater than the thickness of the light source in the direction perpendicular to a surface of the light guide plate, and the light source may be located on the same plane as the lower surface of the light guide plate. In this case, a portion of the side of the light guide plate facing the light source may act as the light receiving surface, and a portion of the side of the light guide plate higher than the light source may act as the light reflecting surface.

According to this configuration, light incident on the light reflecting surface 1032 may be reflected toward a region above the light source 101, so that the display panel located in this region may display an image, whereby the backlight module with this configuration may make full use of light that cannot be incident into the light guide plate, thereby may be able to improve the utilization ratio of light energy. In addition, the backlight module with this configuration may reflect light that cannot be incident into the light guide plate to the portion of display panel above the light source, thereby may be able to reduce the display dark region and increase the area of the effective display region.

Figure 1:
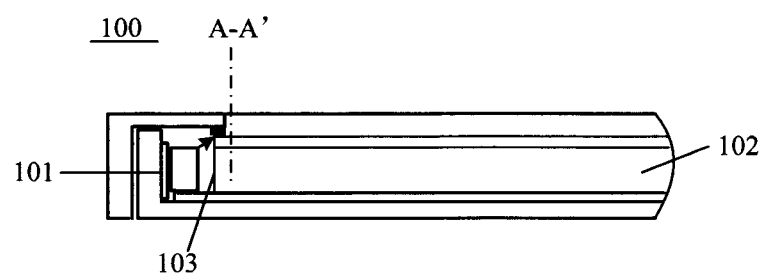
FIG. 1 shows a schematic structural diagram of a conventional backlight module.
Figure 3:
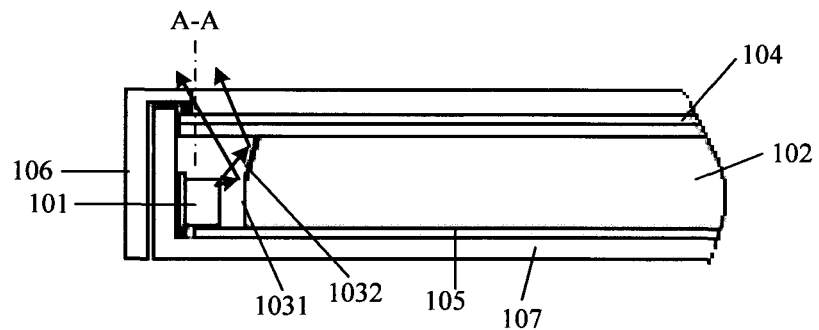
FIG. 3 shows a schematic optical path diagram of a light reflecting surface that reflects light toward a region above the light source.

FIG. 3 shows a schematic optical path diagram of a light reflecting surface that reflects light toward the region above the light source. As shown in FIG. 3, light in the periphery of the central light beam (i.e., light that cannot be incident into the light guide plate) may be incident on the light reflecting surface 1032 of the light guide plate 102, and after being reflected by the light reflecting surface 1032, may transmit toward the region above the light source, it thus may be utilized by the display panel located above the light source. As described above, by employing such configuration, on the one hand, it may be possible to effectively utilize light that cannot be incident into the light guide plate, thereby improving the utilization ratio of light energy, on the other hand, it may be possible to reflect light that cannot be incident into the light guide plate to the portion of display panel above the light source so that light may illuminate the region above the light source, whereby the display dark region (the outer region of the dotted line A-A in FIG. 3) may be reduced, thus a narrow bezel or even bezelless display may be realized. On the contrary, in the backlight module as shown in FIG. 1, since light emitted from the light source cannot reach the portion of the display panel above the light source, which cause the region above the light source to be a display dark region (the outer region of the dotted line A-A' in FIG. 1), a display device manufactured using such a backlight module may have a wide bezel.

It shall be noted that, although FIGS. 2 and 3 schematically show that the light reflecting surface and the light receiving surface may be planes, it can be appreciated that at least one of the light reflecting surface and the light receiving surface may also be provided as a curved surface, such as a convex or concave surface. In the case that the light reflecting surface and the light receiving surface may be curved surfaces, the angle between the light reflecting surface and the light receiving surface may be understood as the angle between the tangent planes therebetween.

In one embodiment, the light reflecting surface 1032 may be formed by coating a reflecting coating on the portion of the side of the light guide plate (the region where the light reflecting surface is located) that is higher than the light source. In this configuration, coating a reflecting coating to form a light reflecting surface is simple in process and convenient in manufacture. It can be appreciated that the light reflecting surface may also be formed in other ways, for example, attaching a reflector to the side portion of the light guide plate above the light source.

In the embodiments described herein, the light source may be one or more of a light emitting diode, a cathode fluorescent tube, an electroluminescent sheet, and an organic electroluminescent sheet.

In an exemplary embodiment, as shown in FIGS. 2 and 3, the backlight module 100 may further include a reflecting element 105 provided below the light guide plate 102, and the reflecting element 105 may extend to the region below the light source 101. With this configuration, light directed to the reflecting element 105 may be reflected toward the display panel above the backlight module, and thus the loss of light energy may also be reduced.

Further as shown in FIGS. 2 and 3, the backlight module 100 may further include one or more optical films 104 provided above the light guide plate 102, which optical films 104 may extend to the region above the light source. In the embodiments described herein, the optical films 104 may include a brightness enhancement sheet, a diffusion sheet, or the like. In an example, the brightness enhancement sheet may be formed by several parallel-arranged micro-prism structures and a substrate for increasing the brightness within a particular viewing angle range of the backlight module. The diffusion sheet generally may contain methyl methacrylate micro-particles as diffusing particles for diffusing light.

Further as shown in FIGS. 2 and 3, the backlight module 100 may further include a backplate 107 provided below the light guide plate 102 and the light source 101, which backplate may function, for example, for fixing and supporting the light guide plate 102 and the light source 101.

In an alternative embodiment, as shown in FIGS. 2 and 3, the backlight module 100 may further include, for example, a sealant 106 for encapsulating and fixing the light source 101, the light guide plate 102, the optical sheet 104, and the like.

Figure 4:
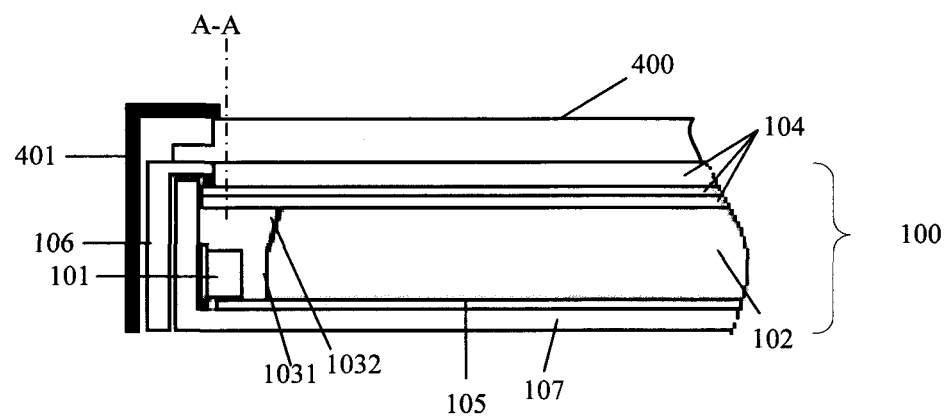
FIG. 4 shows a schematic structural diagram of an exemplary display device provided in an embodiment of the present disclosure.

FIG. 4 shows a schematic structural diagram of an exemplary display device provided in an embodiment of the present disclosure.

As shown in FIG. 4, the display device includes the backlight module 100 provided by any of the embodiments described above, and a display panel 400 located above the backlight module 100.

In the present embodiment, the display panel may be any type of display panel that requires illumination by backlight module and has a display function, such as a liquid crystal display panel.

The display device provided by the embodiments of the present disclosure may be applied to any product having a display function, such as a mobile phone, a tablet computer, a television set, a notebook computer, a digital photo frame, or a navigator.

In a specific embodiment, the display device may also include a sealant 106, such as for sealing the light source 101, the light guide plate 102, the optical film sheet 104, and the like, and a light shielding frame 401, such as for preventing light from being leaked to the outside of the display region.

It should be noted that, since the display panel provided in the present embodiment adopts the backlight module in any of the above embodiments, the description with respect to the structure, function and effect of the backlight module in the above-described embodiments is also applicable to the present embodiment.

To be noted, in the descriptions of the present disclosure, the orientations and positional relationships indicated by the terms 'on', 'above', 'under', 'below', 'top', 'bottom', 'between', etc. are based on those illustrated in the drawings, just for facilitating the descriptions of the present disclosure and simplifying the descriptions, rather than specifying or implying that the concerned apparatuses or elements must have particular orientations, or being configured and operated in particular orientations, and hence cannot be understood as limitations to the present disclosure. For example, when an element or layer is referred to as being 'on' another element or layer, it may be directly located on the another element or layer, or there may be an intermediate element or layer, similarly, when an element or layer is referred to as being 'under' another element or layer, it may be directly located under the another element or layer, or there may be at least one intermediate layer or element, and when an element or layer is referred to as being 'between' two elements or layers, it may be an unique element or layer between the two elements or layers, or there may be more than one intermediate element or layer.

As used in the appended claims, the singular form of a word includes the plural, and vice versa, unless the context clearly dictates otherwise. Thus, when a singular is referred to, the plural of the corresponding term is usually comprised. Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

The foregoing description of the embodiments has been provided for the purpose of illustration and description. It is not intended to be exhaustive or to limit the present application. The various elements or features of a particular embodiment are not normally limited to a particular embodiment, but where appropriate, these elements and features are interchangeable and may be used in the selected embodiment, even if no particularly illustrated or described. Thus, the disclosure may be changed in many ways. Such change cannot to be regarded as a departure from the present application, and all such modifications are intended to be included within the scope of the present application.

What is claimed is:

1. A backlight module comprising:
   a light source; and
   a light guide plate, the light source being provided on at least one side of the light guide plate, wherein a side of the light guide plate facing the light source comprises a light receiving surface facing the light source and a light reflecting surface above the light receiving surface, the light reflecting surface facing away from the light guide plate, for reflecting light from the light source only toward an outside of the light guide plate, and wherein an angle formed by the light receiving surface and the light reflecting surface in a direction toward an inside of the light guide plate is an obtuse angle, wherein the backlight module further comprises one or more optical films provided above the light guide plate, the optical films extending to a region above the light source.

2. The backlight module according to claim 1, wherein the angle formed by the light receiving surface and the light reflecting surface is greater than 150° and less than 180°.

3. The backlight module according to claim 1, wherein a thickness of the light guide plate is greater than a thickness of the light source in a direction perpendicular to a surface of the light guide plate, and wherein the light source is located on the same plane as a lower surface of the light guide plate.

4. The backlight module according to claim 3, wherein a portion of the side of the light guide plate facing the light source acts as the light receiving surface and a portion of the side of the light guide plate above the light source acts as the light reflecting surface.

5. The backlight module according to claim 1, wherein the light reflecting surface comprises a reflecting coating.

6. The backlight module according to claim 1, wherein the backlight module further comprises a reflecting element provided below the light guide plate, the reflecting element extending to a region below the light source.

7. The backlight module according to claim 1, wherein the optical films comprises at least one of a brightness enhancement sheet and a diffusion sheet.

8. The backlight module according to claim 1, wherein the backlight module further comprises a backplate provided below the light guide plate and the light source.

9. The backlight module according to claim 1, wherein the light reflecting surface is one of a planar surface, a concave surface, and a convex surface, and wherein the light receiving surface is one of a planar surface, a concave surface, and a convex surface.

10. A display device comprising a backlight module provided in claim 1 and a display panel located above the backlight module, wherein the display panel extends to the region above the light source.

11. The display device according to claim 10, wherein the angle formed by the light receiving surface and the light reflecting surface is greater than 150° and less than 180°.

12. The display device according to claim 10, wherein a thickness of the light guide plate is greater than a thickness of the light source in a direction perpendicular to a surface of the light guide plate, and wherein the light source is located on the same plane as a lower surface of the light guide plate.

13. The display device according to claim 12, wherein a portion of the side of the light guide plate facing the light source acts as the light receiving surface and a portion of the side of the light guide plate above the light source acts as the light reflecting surface.

14. The display device according to claim 10, wherein the light reflecting surface comprises a reflecting coating.

15. The display device according to claim 10, wherein the backlight module further comprises a reflecting element provided below the light guide plate, the reflecting element extending to a region below the light source.

16. The display device according to claim 10, wherein the backlight module further comprises a backplate provided below the light guide plate and the light source.

17. The display device according to claim 10, wherein the light reflecting surface is one of a planar surface, a concave surface, and a convex surface, and wherein the light receiving surface is one of a planar surface, a concave surface, and a convex surface.

* * * * *

UNITED STATES PATENT AND TRADEMARK OFFICE
CERTIFICATE OF CORRECTION

PATENT NO. : 10,317,727 B2  
APPLICATION NO. : 15/541969  
DATED : June 11, 2019  
INVENTOR(S) : Hui Zheng et al.

Page 1 of 1

It is certified that error appears in the above-identified patent and that said Letters Patent is hereby corrected as shown below:

On the Title Page

Item (54) and in the Specification, Column 1, Line 1, in Title, delete "BLACKLIGHT" and insert therefor -- BACKLIGHT --.

Signed and Sealed this  
Twenty-seventh Day of August, 2019

Andrei Iancu  
*Director of the United States Patent and Trademark Office*